United States Patent
Benkler et al.

(10) Patent No.: US 8,141,934 B2
(45) Date of Patent: Mar. 27, 2012

(54) MOUNT FOR AN ARMREST IN THE INTERIOR OF A MOTOR VEHICLE

(75) Inventors: Olaf Benkler, Neuhausen/Schellbronn (DE); Benno Gayer, Vaihingen/Enz (DE); Wilfried Radon, Bad Liebenzell-Monakam (DE)

(73) Assignee: Dr. Ing. h.c.F. Porsche Aktiengesellschaft (DE)

(*) Notice: Subject to any disclaimer, the term of this patent is extended or adjusted under 35 U.S.C. 154(b) by 364 days.

(21) Appl. No.: 12/536,574

(22) Filed: Aug. 6, 2009

(65) Prior Publication Data

US 2010/0096901 A1    Apr. 22, 2010

(30) Foreign Application Priority Data

Oct. 17, 2008 (DE) .................... 10 2008 053 602

(51) Int. Cl.
*B60J 9/00* (2006.01)

(52) U.S. Cl. ............................................ 296/153

(58) Field of Classification Search .................. 296/152, 296/153; 297/463.1
See application file for complete search history.

(56) References Cited

U.S. PATENT DOCUMENTS

| | | | | | |
|---|---|---|---|---|---|
| 1,426,787 | A | * | 8/1922 | Spencer | 296/153 |
| 1,650,385 | A | * | 11/1927 | Payton | 296/153 |
| 1,674,385 | A | * | 6/1928 | Wolff | 83/729 |
| 1,760,450 | A | * | 5/1930 | Taylor | 296/153 |
| 2,549,100 | A | * | 4/1951 | Kershaw | 296/152 |
| 2,838,340 | A | * | 6/1958 | Johnson | 296/153 |
| 6,773,055 | B1 | * | 8/2004 | Stoudt et al. | 296/153 |
| 6,902,217 | B1 | * | 6/2005 | Farrell | 296/153 |
| 6,938,862 | B2 | * | 9/2005 | Orona | 296/153 |
| 7,731,268 | B2 | * | 6/2010 | Motowski et al. | 296/153 |

FOREIGN PATENT DOCUMENTS

DE    10 2006 055 490 A1    5/2008

* cited by examiner

*Primary Examiner* — Lori Lyjak
(74) *Attorney, Agent, or Firm* — Gerald E. Hespos; Michael J. Porco

(57) ABSTRACT

A mount (22) for an armrest (14, 14a, 14b) in the interior of a motor vehicle is distinguished by the fact that the mount (22) is designed to react differently to forces that act on the mount (22) from different directions (18, 20).

15 Claims, 2 Drawing Sheets

MOUNT FOR AN ARMREST IN THE INTERIOR OF A MOTOR VEHICLE

CROSS-REFERENCE TO RELATED APPLICATIONS

This application claims priority under 35 USC 119 to German Patent Application No. 10 2008 053 602.4 filed on Oct. 17, 2008, the entire disclosure of which is incorporated herein by reference.

BACKGROUND OF THE INVENTION

1. Field of the Invention

The invention relates to a mount for an armrest in the interior of a motor vehicle.

2. Description of the Related Art

DE 10 2006 055 490 A1 discloses a mount for an armrest in the interior of a motor vehicle. That document shows a two-part armrest that extends transversely across a door gap between a vehicle door and a door pillar of the vehicle body. A first part of the armrest is fastened to the inner side of the vehicle door and a second part is fastened to the door pillar. The pillar constitutes a load-bearing part of a self-supporting monocoque body. The self-supporting monocoque body also is referred to below as a body shell. The second part of the known armrest comprises a carrier and a cover that forms the visible part of the armrest. The carrier is screwed to a holder device of the body shell and, in the mounted state, has stable structures that project into the inside of the vehicle and to which the armrest is fastened.

The carrier thus defines a mount for an armrest in the interior of a motor vehicle. The mount supports the bodyweight of a person who is getting into and out of the vehicle. Thus, the mount must reliably accommodate correspondingly high forces acting in the direction of the vertical axis of the vehicle and channel those forces into the body shell. This requirement can be met easily by a mount that has a correspondingly stable construction. However, a mount with a stable construction can put the vehicle occupants at risk in the event of a side impact crash in which the body shell is pressed in from the outside.

Against this background, an object of the invention is to provide a mount for an armrest in the interior of a motor vehicle that can reliably support the bodyweight of a person who is when getting into and out of the vehicle and that does not adversely affect the safety of the vehicle occupants during a side impact crash.

SUMMARY OF THE INVENTION

The invention relates to a mount for an armrest that reacts differently to forces that act on the mount from different directions. Thus, the mount is optimized for the loading case of supporting a person's bodyweight. However, this optimization is not achieved at the expense of occupant safety during the loading case of a side impact crash.

The mount preferably is more resistant to forces that act in the direction of the motor vehicle vertical axis than to forces that act in the direction of the motor vehicle transverse axis.

The mount preferably has a stiffer construction in the direction of the vertical axis. Thus, the bodyweight-supporting forces can be assumed reliably. In contrast, the armrest does not have to assume any significant forces in the direction of the vehicle transverse axis during normal use. Thus, the mount is designed to be more compliant in the direction of the vehicle transverse axis, thereby reducing the risk of injury from the mount during a side impact crash.

The mount preferably is designed to take up forces greater than 500 N acting in the direction of the vertical axis without permanent deformation and to channel these vertical forces into the vehicle body.

The mount preferably comprises a bending hinge that reacts through a plastic deformation to forces that act in the direction of the vehicle transverse axis, namely those forces that occur during a side impact crash.

The mount is pressed toward the inside of the vehicle during a side impact crash. However, the rotation that can occur in the bending hinge enables the mount to deflect on striking a backrest of a seat or a body part of a vehicle occupant.

The deformation work required for the plastic deformation of the bending hinge reduces the deformation energy, thereby also reducing the risk of injury.

Further advantages will become apparent from the following description and the appended drawing. The features mentioned above and explained below can be used in the combination specified and in other combinations or on their own without departing from the scope of the invention.

DETAILED DESCRIPTION OF THE PREFERRED EMBODIMENTS

Figure 1:
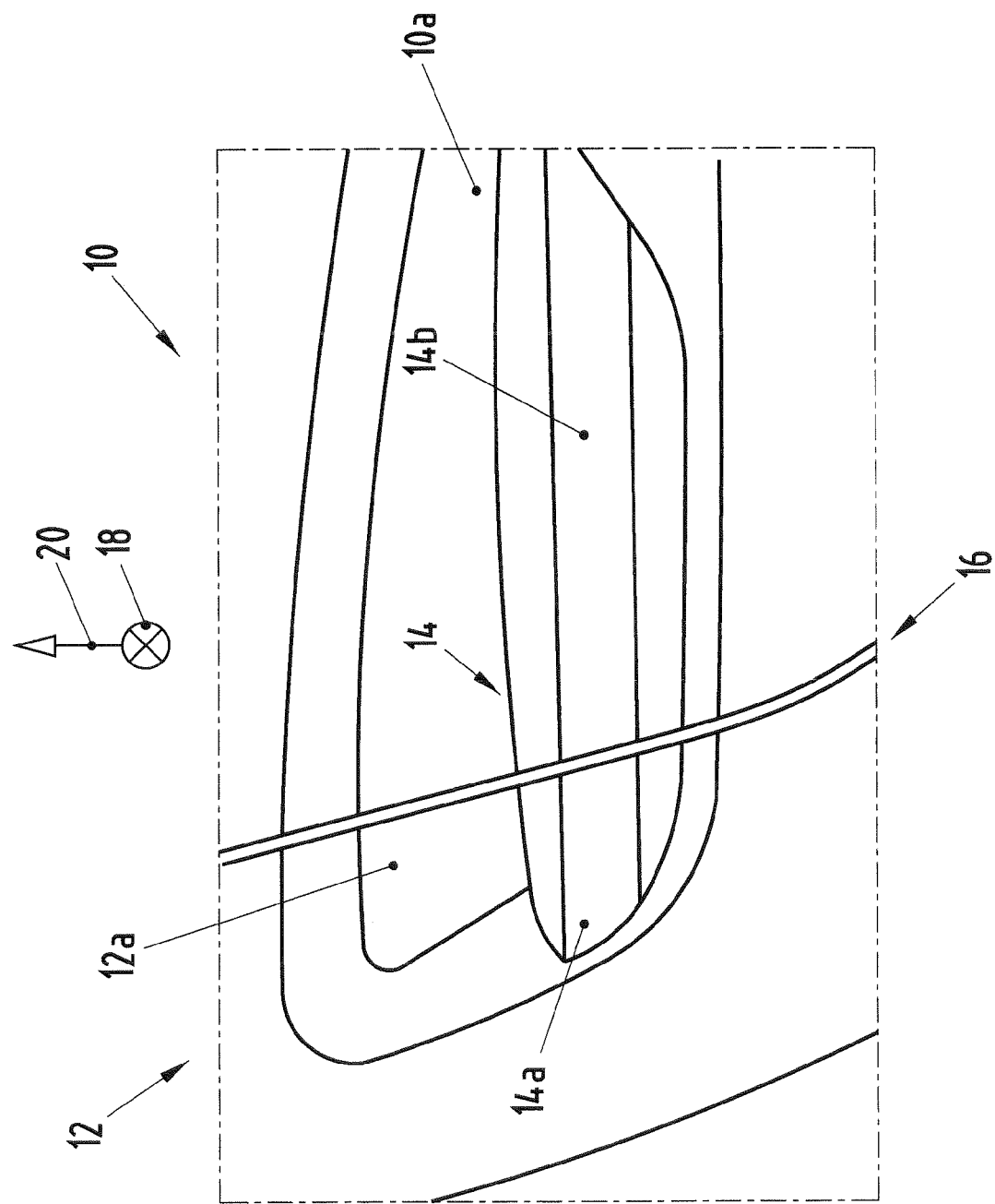
FIG. 1 is a side elevation view of an inner lining of a door and an inner lining of a door pillar of a motor vehicle taken from inside the motor vehicle.

FIG. 1 shows an inner lining 10 of a door and an inner lining 12 of a door pillar of a motor vehicle taken from the inside of the motor vehicle. An armrest 14 extends transversely across a door gap 16 and has first and second parts 14a, 14b. The first part 14a is fastened to the door pillar situated behind the inner lining 12, while the second part 14b is fastened to structures of the vehicle door situated behind the inner lining 10.

The armrest 14 is arranged in depressions 10a, 12a of the inner lining 10, 12. The lines 18, 20 delimit more deeply lying regions 10a, 12a of the inner linings 10, 12 from regions of the inner linings 10, 12 situated at a higher level in the vehicle transverse direction 18. The vehicle transverse direction 18 is perpendicular to the plane of FIG. 1, whereas the direction 20 of the vehicle vertical axis lies in the plane of FIG. 1. The invention relates to a mount that fastens the first part 14a or the second part 14b of the armrest 14 to the underlying vehicle body structure.

Figure 2:
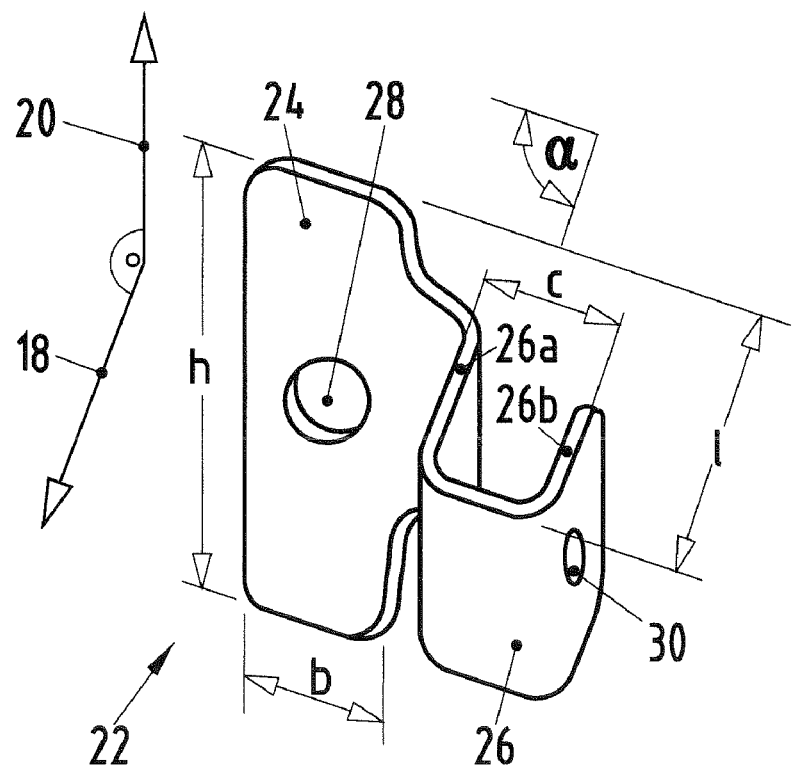
FIG. 2 is a perspective view of a holder according to the invention taken from a first angle of view.

A mount in accordance with the invention is identified generally by the numeral 22 in FIG. 2. The mount 22 of this embodiment defines a one-piece sheet metal profile that has a bearing portion 24 and a holder 26. The bearing portion 24 is designed to bear against the vehicle body. The holder 26 projects from the bearing portion 24 at an angle α and is designed for fastening the armrest 14, 14a or 14b. The bearing portion 24 and the holder 26 merge into one another in a transition region.

The bearing portion 24 has a cutout 28 that is configured to fasten the mount 22 to the body shell. This fastening preferably is achieved by a welded connection. However, a separate mechanical connector, such as a screw, bolt or rivet, can be provided.

The holder 26 has a U-profile with a first leg 26a and a second leg 26b and a connecting panel 26c that extends unitarily between the first and second legs 26a and 26b. The first leg 26a merges into the transition region and the second leg 26b is configured for fastening the armrest. More particularly, the holder 26 has a cutout 30 as a screw-fastening point for the armrest 14, 14a or 14b. The cutouts 28 and 30 are examples of means for fastening the holder 22 to the body shell and for fastening the armrest 14, 14a or 14b to the mount 22.

The transition region of the mount 22 between the bearing portion 24 and the holder 26 does not have any curvature in the direction of the vertical axis 20 of the vehicle (i.e. no curvature about a horizontal axis). This illustrated shape of the transition region and the remaining profiled shape of the mount 22 ensures the desired high degree of stability in the vehicle vertical axis direction 20.

Figure 3:
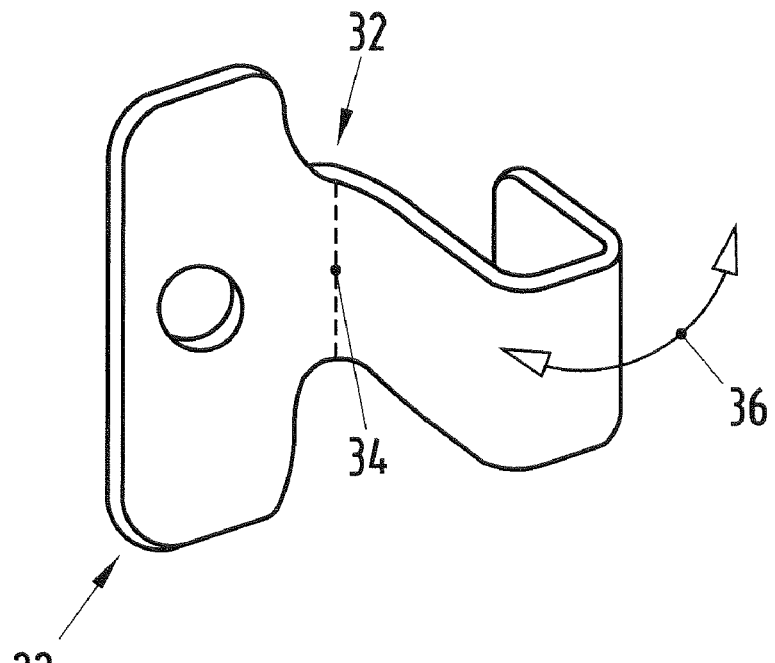
FIG. 3 is a perspective view of the holder taken from a taken angle of view.

By contrast, the transition region of the mount 22 has a curvature in the plane in which the angle α lies. This curvature of the transition region defines a bending hinge 32 with a bending line 34, as is represented by dashes in the perspective rotated position of the mount 22 in FIG. 3. The bending hinge 34 is designed to react through a plastic bending movement in which the holder 26 rotates relative to the bearing portion 24 in the direction of the arrow 36 in the event of forces acting in the direction of the vehicle transverse axis, as occur during a side impact crash.

The preferred bearing portion 24 has a height h of 50 to 70 mm and a width b of 20 to 30 mm. The holder 26 preferably projects from the bearing portion 24 at an angle α between 70 degrees and 110 degrees and with a length l between 30 mm and 50 mm. The distance between the legs 26a, of the holder 26 is preferably 15 to 25 mm. It is also preferable for the sheet thickness of the steel sheet profile to be between 2.5 mm and 3.5 mm.

What is claimed is:

1. A mount for an armrest in an interior of a motor vehicle, the mount comprising a bending hinge that reacts through a plastic deformation to forces acting substantially parallel to a transverse axis of the motor vehicle so that the mount is more resistant to forces acting substantially parallel to a vertical axis of the motor vehicle than to forces acting substantially parallel to the transverse axis of the motor vehicle.

2. The mount of claim 1, wherein the mount is designed to take up forces of 500 N acting substantially parallel to the vertical axis of the motor vehicle without permanent deformation and to channel the forces acting substantially parallel to the vertical axis of the motor vehicle into the vehicle body.

3. The mount of claim 1, wherein the mount comprises a 1-peace sheet metal profile that has a bearing portion disposed to bear against a body of the vehicle, and a holder that projects from the bearing portion at an angle (α), the holder being configured for fastening the armrest.

4. The mount of claim 3, wherein the bearing portion and the holder merge into one another in a transition region that does not have any curvature in the direction of the vertical axis of the vehicle when the mount is installed in the vehicle.

5. The mount of claim 4, wherein the holder comprises a U-profile with a first leg and a second leg, the first leg merging into the transition region and the second leg being configured for fastening the armrest.

6. The mount of claim 5, wherein the bearing portion has a height of 50 to 60 mm and a width of 20 to 30 mm, the holder projecting from the bearing portion at an angle (α) of between 70 degrees and 110 degrees and having a length between 30 mm and 50 mm, and a distance between the legs being 15 to 25 mm.

7. The mount of claim 1, wherein the mount is produced as a steel sheet profile.

8. The mount of claim 7, wherein the steel sheet profile has a thickness is between 2.5 mm and 3.5 mm.

9. A mount for an armrest in an interior of a motor vehicle, the mount comprising: a unitary metal sheet having a bearing portion disposed to bear against a body of the vehicle, and a holder joined unitarily to the bearing portion along a substantially vertical hinge line so that the holder projects from the bearing portion at an angle (α), the holder being configured for fastening the armrest, the substantially vertical hinge line substantially preventing deformation of the holder relative to the bearing portion in response to vertical forces on the holder, while permitting plastic deformation of the holder relative to the bearing portion in response to substantially horizontal forces on the bearing portion or the holder.

10. The mount of claim 9, wherein the holder is substantially U-shaped and has a first leg joined unitarily to the bearing portion along the substantially vertical hinge line so that the first leg projects from the bearing portion at the angle (α), the holder further having a connecting panel bent from the first leg and a second leg bent from the connecting panel, the second leg being configured for fastening the armrest.

11. The mount of claim 9, wherein the bearing portion is substantially vertically aligned.

12. A motor vehicle, comprising:
a vehicle body;
a door mounted to the vehicle body;
a mount for an armrest in an interior of a motor vehicle, the mount comprising: formed from a unitary metal sheet and having a bearing portion secured to the vehicle body or the door and a holder joined unitarily to the bearing portion along a substantially vertical hinge line so that the holder projects from the bearing portion at an angle (α); and
an armrest fastened to the holder, whereby the substantially vertical hinge line prevents deformation of the holder relative to the bearing portion in response to vertical forces on the armrest, but permits plastic deformation of the holder relative to the bearing portion in response to substantially horizontal forces on the vehicle body or the door.

13. The motor vehicle of claim 12, wherein the bearing portion has a height of 50 to 60 mm and a width of 20 to 30 mm, the holder projecting from the bearing portion at an angle (α) of between 70 degrees and 110 degrees and having a length between 30 mm and 50 mm, and a distance between the legs being 15 to 25 mm.

14. The motor vehicle of claim 12, wherein the mount is produced as a steel sheet profile.

15. The motor vehicle of claim 12, wherein the steel sheet profile has a thickness is between 2.5 mm and 3.5 mm.

* * * * *